United States Patent [19]

Ozono

[11] Patent Number: 4,588,639
[45] Date of Patent: May 13, 1986

[54] MICRO-CAPSULES AND METHOD OF PREPARING SAME

[75] Inventor: Masayoshi Ozono, Hachioji, Japan
[73] Assignee: Three Bond Co., Ltd., Tokyo, Japan
[21] Appl. No.: 532,983
[22] Filed: Sep. 16, 1983
[51] Int. Cl.⁴ .................................................. B01J 13/02
[52] U.S. Cl. ................................ 428/402.22; 264/4.7; 427/54.1
[58] Field of Search ............ 428/402.22, 402.2, 402.21; 264/4.7; 427/54.1

[56] References Cited

U.S. PATENT DOCUMENTS

| | | | |
|---|---|---|---|
| 3,704,264 | 11/1972 | Gorman | 428/402.22 |
| 3,779,941 | 12/1973 | Powell | 252/316 |
| 4,001,140 | 1/1977 | Foris et al. | 252/316 |
| 4,110,511 | 8/1978 | Lee et al. | 428/402.21 X |
| 4,112,138 | 9/1978 | Davis et al. | 427/54.1 |
| 4,228,216 | 10/1980 | Austin et al. | 428/402.21 X |
| 4,370,160 | 1/1983 | Ziemelis | 264/4.7 X |
| 4,394,287 | 7/1983 | Scarpelli | 424/37 X |

FOREIGN PATENT DOCUMENTS

| | | | |
|---|---|---|---|
| 2458959 | 6/1975 | Fed. Rep. of Germany | 427/54.1 |
| 42446 | 1/1942 | Japan | 428/402.21 |

*Primary Examiner*—Edward A. Miller
*Assistant Examiner*—Virginia B. Caress
*Attorney, Agent, or Firm*—Schwartz, Jeffery, Schwaab, Mack, Blumenthal & Evans

[57] ABSTRACT

Micro-capsules are prepared by dispersing a composition comprising a hydrophobic acrylate or methacrylate monomer or oligomer capable of polymerization upon exposure to ultraviolet light, a photosensitizer, and a UV screening agent in water containing a dispersant to form a colloidal dispersion, and exposing the dispersion to UV light to cause the colloidal particles to cure only at their surface. The resulting microcapsules have a core of the uncured acrylate or methacrylate monomer or oligomer encapsulated with a wall layer of the cured acrylate or methacrylate.

13 Claims, 4 Drawing Figures

MICRO-CAPSULES AND METHOD OF PREPARING SAME

BACKGROUND OF THE INVENTION

This invention relates to novel and improved micro-capsules based on acrylate or methacrylate monomers or oligomers, and a method of preparing micro-capsules from acrylate or methacrylate monomers or oligomers.

In the prior art, micro-capsules of hydrophobic acrylates or methacrylates are typically prepared by the coacervation method utilizing phase separation between gelatin and gum arabic, for example. This method requires a fine adjustment of the temperature, pH, and concentration of the colloidal solution. Additionally, the curing of the wall layer of micro-capsules undesirably requires complicated operation and a long time to complete the reaction.

It is, therefore, an object of the present invention to provide a novel and improved method of preparing micro capsules from acrylates or methacylates in a simple manner within a short period of time while eliminating the above-indicated shortcomings.

SUMMARY OF THE INVENTION

As a result of extensive investigations, the inventors have found that an acrylate or methacrylate monomer or oligomer may be formed into micro-capsules within a short period of time at room temperature simply by dispersing a composition comprising the acrylate or methacrylate monomer or oligomer, a photosensitizer, and a ultraviolet screening agent in water containing a water-soluble high molecular weight compound for emulsification and exposing the emulsion to ultraviolet light.

BRIEF DESCRIPTION OF THE DRAWINGS

The above and other objects, features, and advantages of the present invention will be more fully understood by reading the following description taken in conjunction with the accompanying drawings, in which.

DESCRIPTION OF THE PREFERRED EMBODIMENT

Figure 1:
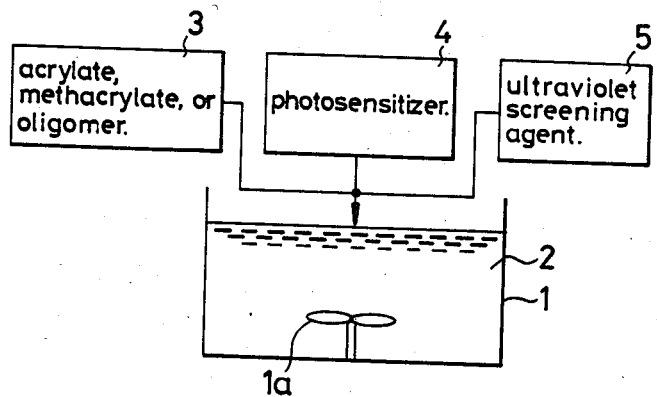
FIGS. 1, 2 and 3 illustrate a series of steps of the micro-capsule preparing method according to the present invention.
Figure 2:
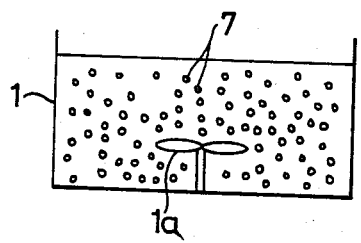

Referring to FIG. 1, a tank 1 equipped with a propeller mixer 1a receives an aqueous solution 2 containing a water-soluble high molecular weight compound therein. A composition composed of an acrylate or methacrylate monomer or oligomer 3, a photosensitizer 4, and a ultraviolet screening agent 5 is introduced into the solution 2, which is agitated by the propeller mixer 1a to thereby disperse the acrylate or methacrylate monomer or oligomer 3 in the aqueous solution 2, forming a dispersion of colloidal particles 7 as shown in FIG. 2.

Some illustrative, non-limiting examples of the water-soluble soluble high molecular weight compounds used herein include gum arabic, tragacanth gum, guar gum, locust bean gum, sodium alginate, carboxymethyl cellulose, hydroxyethyl cellulose, methyl cellulose, polyvinyl alcohol gelatin, albumin, casein, polyvinyl pyrrolidone, etc. They not only serve as an emulsifying/dispersing agent, but also have the function of preventing the flocculation of the resulting colloidal particles. The amount of the high molecular weight compounds added preferably ranges from 1% to 10% by weight based on the weight of water.

The acrylate and methacrylate monomers and oligomers used herein are not particularly limited as long as they are hydrophobic and capable of polymerization upon exposure to ultraviolet light when a photosensitizer is added thereto. Some illustrative, non-limiting examples of the acrylates and methacrylates include 2-hydroxypropyl acrylate and methacrylate,
methyl acrylate and methacrylate,
ethyl acrylate and methacrylate,
2-ethylhexyl acrylate and methacrylate,
cyclohexyl acrylate and methacrylate,
diethylaminoethyl acrylate and methacrylate,
glycidyl acrylate and methacrylate,
tetrahydrofurfuryl acrylate and methacrylate,
ethylene glycol diacrylate and dimethacrylate,
diethylene glycol diacrylate and dimethacrylate,
triethylene glycol diacrylate and dimethacrylate,
tetraethylene glycol diacrylate and dimethacrylate,
polyethylene glycol diacrylate and dimethacrylate,
1,3-butylene glycol diacrylate and dimethacrylate,
1,6-hexanediol diacrylate and dimethacrylate,
neopentyl glycol diacrylate and dimethacrylate,
2,2'-bis(4-acryloxypropyloxyphenyl)propane and 2,2'-bis(4-methacryloxypropyloxyphenyl)propane,
2,2'-bis(4-acryloxydiethoxyphenyl)propane and 2,2'-bis(4-methacryloxydiethoxyphenyl)propane,
trimethylolpropane triacrylate and trimethacrylate,
dicyclopentadiene monoacrylate and monomethacrylate,
dicyclopentadiene ethoxy acrylate and methacrylate, etc.

These monomers and oligomers may also be used in combination with epoxy acrylate and methacrylate, urethane acrylate and methacrylate, and unsaturated polyesters. These monomers and oligomers may be added in amounts of up to about 100% by weight (or substantially equal amount) based on the water as long as they may be dispersed into an emulsion.

The photosensitizer 4 may be selected from those commonly used in ultraviolet curing. Some illustrative, non-limiting examples of the photosensitizers include benzoin ethyl ether, benzoin isopropyl ether, benzophenone, xanthone, thioxanthone, acetophenone, 2,2'-diethoxyacetophenone, 2,2'-dimethoxy-2-phenylacetophenone, benzyl, etc. The photosensitizers may be added in amounts between 0.1 and 20 parts by weight per 100 parts by weight of the acrylate or methacrylate monomer or oligomer.

The ultraviolet screening agent 5 may be selected from dyes, pigments, and UV light absorbers as long as it completely or substantially prevents transmission of UV light. Oil-soluble dyes may be used as the dye while the pigment may be selected from a wide variety of loading pigments and color pigments including talc, clay, calcium carbonate, magnesium carbonate, and carbon black. Examples of the UV light absorbers include p-t-butylphenyl salicylate, 2,4-dihydroxybenzophenone, 2-hydroxy-4-methoxybenzophenone, 2-hydroxy-4-octoxybenzophenone, 2(2'-hydroxy-4'-octoxyphenyl)benzotriazole, etc. and they may be used individually or in mixtures of two or more. The amount of the UV screening agent added depends on its UV screening ability or UV transmission while the thickness of the capsule wall layer varies with the amount of the UV screening agent, UV illumination and exposure time. The amount of the UV screening agent added ranges from 0.1 parts to 20 parts by weight per 100 parts by weight of the acrylate or methacrylate monomer or oligomer.

Figure 3:
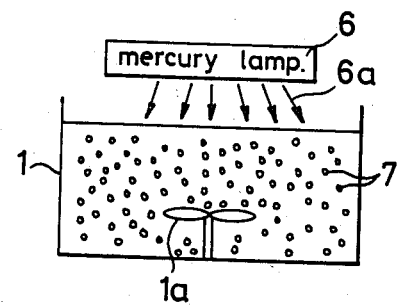

The next step is to expose the colloidal paricles to ultraviolet light 6a, for instance from a mercury lamp 6, as uniformly as possible while the colloidal solution resulting from the preceding dispersing/emulsifying steps is thoroughly agitated as shown in FIG. 3. The satisfactory irradiation dose is generally given by an exposure for 1 to 30 minutes at an illumination of 200 to 1 mW/cm$^2$ although the exposure time may be somewhat changed depending on the volume of the colloidal solution.

Figure 4:
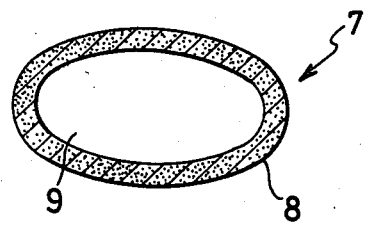
FIG. 4 is an enlarged view showing a cross section of a micro-capsule prepared by the present method.

In this way, the colloidal particles 7 of the acrylate or methacrylate monomer or oligomer dispersed in the aqueous solution containing the water-soluble high molecular weight compound undergo polymerization or curing upon exposure to UV light. Since the UV screening agent is present in the colloidal particles, this polymerization reaction takes place only at the surface of the colloidal particles of the acrylate or methacrylate monomer or oligomer, and does not proceed to the interior of the colloidal, particles. At the end of UV exposure, the interior of the particles remains intact or uncured and is thus encapsulated as a core 9. The UV exposure results in colloidal particles or micro-capsules consisting of the fluid core 9 of the uncured acrylate or methacrylate monomer or oligomer and a solid wall layer 8 of the cured acrylate or methacrylate formed on the capsule surface and encapsulating the core as shown in FIG. 4.

Since the present method of preparing micro-capsules from an acrylate or methacrylate monomer or oligomer only requires the steps of dispersing the monomer or oligomer to form a colloidal dispersion and exposing the colloidal particles to UV light, micro-capsules can be prepared very easily in a controlled manner within a short period of time.

Since the core and the encapsulating wall layer of which a micro-capsule consists are of the same material except that the wall layer is a polymerized or cured product of the core material, no consideration should be given to a wall-forming agent with which a core is encapsulated as in the prior art interfacial polymerization method.

In order that the micro-capsules of the present invention can be used as an adhesive or locking agent, a polymerization accelerator or organic peroxide polymerization initiator may be added to the acrylate or methacrylate monomer or oligomer. Similarly, anaerobic adhesives based on the acrylates and methacrylates and having a proper additive selected from organic hyperoxides, o-sulfobenzimides, and amines incorporated may be formed into micro-capsules.

The following working examples will further illustrate the practice of the present invention as herein disclosed. They are given by way of illustration and are not to be construed as limiting the invention. Parts are by weight.

EXAMPLE 1

11.2 g of a composition of 10 parts of tetraethylene glycol dimethacrylate, 0.5 parts of 2,2-diethoxyacetophenone, and 0.7 parts of Oil Yellow #5001 (manufactured and sold by Arimoto Chemicals K.K.) was dispersed and emulsified in 500 cc of water containing 5 g of methyl cellulose dissolved, and the dispersion was fully agitated so as to form colloidal particles having a particle size between 50 and 300 microns. With agitation continued, the dispersion was exposed to UV light for 3 minutes under a 300-watt high pressure mercury lamp. There were formed spherical micro-capsules having a core of tetraethylene glycol dimethacrylate encapsulated intact.

The above procedure was repeated except that Oil Yellow #5001 was excluded from the starting composition. Polymeric particles were obtained in which the tetraethylene glycol dimethacrylate was not left as the core, failing to form the desired micro-capsules having a liquid core encapsulated.

EXAMPLE 2

10.7 g of a composition of 10 parts of 2,2'-bis (4-methacryloxy-diethoxyphenyl)propane, 0.2 parts of benzoin ethyl ether, and 0.5 parts of 2-hydroxy-4-methoxybenzophenone was dispersed and emulsified in 500 cc of water containing 2 g of polyvinyl alcohol dissolved, and the dispersion was fully agitated so as to form colloidal particles having a particle size between 50 and 300 microns. With agitation continued, the dispersion was exposed to UV light for 5 minutes under a 300-watt high pressure mercury lamp. There were formed spherical microcapsules having a core of 2,2'-bis(4-methacryloxydiethoxyphenyl)propane encapsulated intact.

The above procedure was repeated except that 2-hydroxy-4-methoxybenzophenone was excluded from the starting composition. Polymer particles were obtained, failing to form the desired micro-capsules having a liquid core encapsulated.

EXAMPLE 3

12 g of a composition of 10 parts of trimethylolpropane trimethacrylate, 1 part of 2,2'-dimethoxy-2-phenylacetophenone, and 1 part of a green color pigment, VT 6510 (manufactured and sold by Dainichi-Seika Industry K.K.) was dispersed and emulsified in 500 cc of water containing 5 g of polyvinyl pyrrolidone dissolved, and the dispersion was fully agitated so as to form colloidal particles having a particle size between 50 and 300 microns. With agitation continued, the dispersion was exposed to UV light for 10 minutes under a 300-watt high pressure mercury lamp. There were formed spherical micro-capsules having a core of liquid or uncured trimethylolpropane trimethacrylate encapsulated.

The above procedure was repeated except that VT 6510 was excluded from the starting composition. Polymer particles were obtained, failing to form the desired micro-capsules.

EXAMPLE 4

To an anaerobic adhesive composition consisting of 10 parts of 2,2'-bis(4-methacryloxydiethoxyphenyl)propane, 0.3 parts of cumene hydroperoxide, 0.05 parts of o-sulfobenzimide, and 0.05 parts of 1,2,3,4-tetrahydroquinoline were added 0.5 parts of 2,2-diethoxyacetophenone and 1 part of a green color pigment, VT 6510. This composition was dispersed and emulsified in water containing 2 g of methyl cellulose dissolved, and the dispersion was fully agitated so as to form colloidal particles having a particle size between 50 and 300 microns. With agitation continued, the dispersion was exposed to UV light for 5 minutes under a 300-watt high pressure mercury lamp. There were formed spherical micro-capsules having the anaerobic adhesive encapsulated. The micro-capsules were dried and then applied to the thread of an iron bolt of M 10×1.5 with the aid of a binder. When a nut was fastened on the bolt, the micro-capsules were ruptured to allow the anaerobic adhesive to emerge from the capsules. The anaerobic adhesive was then allowed to cure for 24 hours at room temperature and the return torque was measured to be 100 kg-cm. This proves that the anaerobic adhesive remained intact within the micro-capsules.

What is claimed is:

1. A method of preparing micro-capsules, comprising the steps of
    dispersing a composition comprising a hydrophobic acrylate or methacrylate monomer or oligomer capable of polymerization upon exposure to ultraviolet light, a photosensitizer, and a ultraviolet screening agent in water containing a water-soluble high molecular weight compound to form a dispersion of colloidal particles, and
    exposing the dispersion to ultraviolet light to cause said colloidal particles to cure only at their surface, thereby forming micro-capsules having a core of the uncured acrylate or methacrylate monomer or oligomer encapsulated with a wall layer of the cured acrylate or methacrylate.

2. The method according to claim 1 wherein the acrylate or methacrylate is added in an amount of up to about 100% based on the weight of water.

3. The method according to claim 1 wherein the photosensitizer is a sensitizer commonly used in ultraviolet curing.

4. The method according to claim 3 wherein the photosensitizer is present in an amount of 0.1 to 20 parts per 100 parts by weight of the acrylate or methacrylate monomer or oligomer.

5. The method according to claim 1 wherein the ultraviolet screening agent is selected from the group consisting of oil-screening soluble dyes, loading and color pigments, and ultraviolet light absorbers.

6. The method according to claim 1 wherein the ultraviolet screening agent is present in an amount of 0.1 to 20 parts per 100 parts by weight of the acrylate or methacrylate monomer or oligomer.

7. The method according to claim 1 wherein the high molecular weight compound serves as a dispersant and is present in an amount of 1 to 10% based on the weight of water.

8. The method according to claim 1 wherein the dispersion is exposed to ultraviolet light for a period of 1 to 30 minutes at an illumination of 200 to 1 mW/cm$^2$.

9. The method according to claim 1 wherein the dispersion contains colloidal particles having a particle size of 50 to 300 microns.

10. A micro-capsule consisting essentially of
    a fluid core encapsulated with a solid wall layer, said core and said wall having an identical composition consisting essentially of an acrylate or methacrylate monomer or oligomer, a polymerization accelerator or initiator, an ultraviolet screening agent and an additive selected from the group consisting of o-sulfobenzimides and amines, said composition constituting an adhesive, and said wall layer being a cured product.

11. The micro-capsule according to claim 10, wherein the adhesive is anaerobic.

12. A micro-capsule consisting essentially of a fluid core encapsulated with a solid wall layer, said core and said wall having an identical composition consisting essentially of an acrylate or methacrylate monomer or oligomer, a polymerization accelerator or initiator, an ultravoilet screening agent and an additive selected from the group consisting of o-sulfobenzimides and amines, said composition constituting an adhesive, said micro-capsule prepared by:
    dispersing the composition in fluid form in water containing a dispersant to form a dispersion of colloidal particles, and
    exposing said dispersion to ultraviolet light to cause said colloidal particles to cure only at their surface.

13. The micro-capsule according to claim 12, wherein the adhesive is anaerobic.

* * * * *